(12) United States Patent
Schwarzbich

(10) Patent No.: US 6,543,956 B2
(45) Date of Patent: Apr. 8, 2003

(54) DEVICE FOR CONNECTING STRUCTURAL COMPONENTS

(76) Inventor: Jörg Schwarzbich, Wertherstrasse 15, Bielefeld (DE), D-33615

( * ) Notice: Subject to any disclaimer, the term of this patent is extended or adjusted under 35 U.S.C. 154(b) by 0 days.

(21) Appl. No.: 09/920,201

(22) Filed: Aug. 1, 2001

(65) Prior Publication Data

US 2002/0018693 A1 Feb. 14, 2002

(30) Foreign Application Priority Data

Aug. 11, 2000 (DE) .......................... 200 13 863
Jan. 20, 2001 (DE) .......................... 201 01 088

(51) Int. Cl.⁷ .................................. F16B 9/00
(52) U.S. Cl. ................ 403/167; 403/168; 403/200; 52/127.12
(58) Field of Search ................ 403/167, 168, 403/374.4, 374.3, 193, 200, 282; 52/127.7, 127.8, 127.12

(56) References Cited

U.S. PATENT DOCUMENTS

| 3,014,563 | A | * | 12/1961 | Bratton ..................... 403/167 |
| 3,332,182 | A | * | 7/1967 | Mark ....................... 52/127.12 |
| 4,373,309 | A | * | 2/1983 | Lutz ........................ 403/168 X |
| 4,682,906 | A | | 7/1987 | Rückert et al. |
| 4,934,861 | A | * | 6/1990 | Weeks et al. ............. 403/167 X |
| 5,271,700 | A | * | 12/1993 | Le Goff .................... 403/282 X |
| 5,288,191 | A | | 2/1994 | Rückert et al. |
| 5,340,258 | A | | 8/1994 | Simon |
| 6,238,123 | B1 | | 5/2001 | Schwarzbich |
| 6,327,829 | B1 | * | 12/2001 | Taguchi ................. 521/127.12 X |

FOREIGN PATENT DOCUMENTS

| DE | 198399710 | | 3/2000 |
| EP | 0176663 | | 4/1986 |
| EP | 0543046 | | 5/1993 |
| EP | 0955479 | | 11/1999 |
| FR | 2691513 | * | 11/1993 ................ 403/167 |

* cited by examiner

Primary Examiner—Lynne H. Browne
Assistant Examiner—David E. Bochna
(74) Attorney, Agent, or Firm—Richard M. Goldberg

(57) ABSTRACT

A device for connecting structural components (10, 12), with a base part (16; 116), which is disposed at the one structural component (10), a spacer (18; on 118), which is in threaded engagement with the base part (16; 116) and is supported with one end at the other (12) structural component, and a connecting screw (20), which is inserted frictionally engaged through the spacer (18; 118), wherein the spacer (18; 118) is surrounded by any jacket (32; 126) of a softer material, preferably of a plastic which, at least in the state, in which the spacer and the base part together have the smallest axial dimension, is flush with the front surface of the spacer (118) or of the hard core (50) of the same or protrudes with respect to this front surface.

17 Claims, 6 Drawing Sheets

DEVICE FOR CONNECTING STRUCTURAL COMPONENTS

BACKGROUND OF THE INVENTION

The invention relates to a device for connecting structural components, with a base part, which is disposed at the one structural component, a spacer, which is in threaded engagement with the base part and is supported with one end at the other structural component, and a connecting screw, which is inserted frictionally engaged through the spacer.

A known device of this type is described in EP-B-0 176 663 and is used to connect two structural components, which are disposed at a particular distance from one another, with the help of the connecting screw without distorting the structural components as the connecting screw is tightened. The connecting screw is inserted, for example, through the structural component, which is to be supported at the spacer, and is then screwed into an internal thread of the other structural component, which is connected with the base part. During this screwing-in motion, the spacer is taken along by friction. The thread between the spacer and the base part is a left-handed thread, so that the spacer is screwed further out of the base part and approaches the structural component, which is held by the head of the connecting screw, until this component finally lies in contact with the front surface of the spacer.

However, if the distance between the structural components, which are to be connected, is greater than the maximum adjusting path of the spacer, it may happen that, as the connecting screw is screwed in, the spacer is screwed completely out of the base part. Since the spacer in this case is accessible only with difficulty, if at all, it is difficult to restore the threaded engagement between the spacer and the base part.

In the state of the connecting device as delivered, the spacer normally is screwed completely into the base part. From practice, a connecting device is known, for which the spacer in this position is in contact with a stop and, in addition is held in position by a spring-mounted latch. However, it must be possible to overcome the resistance of the latch when the connecting screw is being screwed in. Accordingly, it is not impossible that, because of improper handling or jarring, the spacer, before use of the connecting device, becomes detached completely from the base part, so that the parts of the connecting device fall apart and are lost.

For stability reasons, the base part and the spacer should consist of metal. In that case, however, the danger exists that the structural components, which are to be connected to one another, are scratched during the assembly by the spacer, which protrudes from the base part. This problem occurs, for example, in vehicle construction, when a cross member is to be fastened with the help of two such connecting devices between two body parts of the vehicle, which have already been painted.

SUMMARY OF THE INVENTION

It is therefore an object of the invention, to provide a device of the type mentioned above, with which damage by the spacer to one of the structural parts, which is to be connected, is avoided.

Pursuant to the invention, this objective is accomplished owing to the fact that the spacer is surrounded by a jacket of a softer material, preferably of plastic, and that the jacket, at least in the state, in which the spacer and the base part together have the smallest axial dimension, is flush with the front surface of the spacer or of the harder core of the latter or protrudes relative to this front surface.

Advantageous developments of the invention arise from the dependent claims.

A possible embodiment is characterized in that the spacer has a jacket, which overlaps the base part and in that stops are disposed at this jacket and at the base part, which limit the unscrewing movement of the base part and the spacer. In that case, the protective jacket is part of the spacer.

In the case of a different embodiment, the jacket is seated on the base part. Since the device, in the original state, before the start of the assembly work, is adjusted to the smallest possible axial dimension, the spacer lies protected in the jacket until the structural components, which are to be connected, are brought into position and the connecting screw is screwed in.

BRIEF DESCRIPTION OF THE DRAWINGS

In the following, an example of the invention is described in greater detail by means of the drawings, in which.

DETAILED DESCRIPTION

Figure 1:
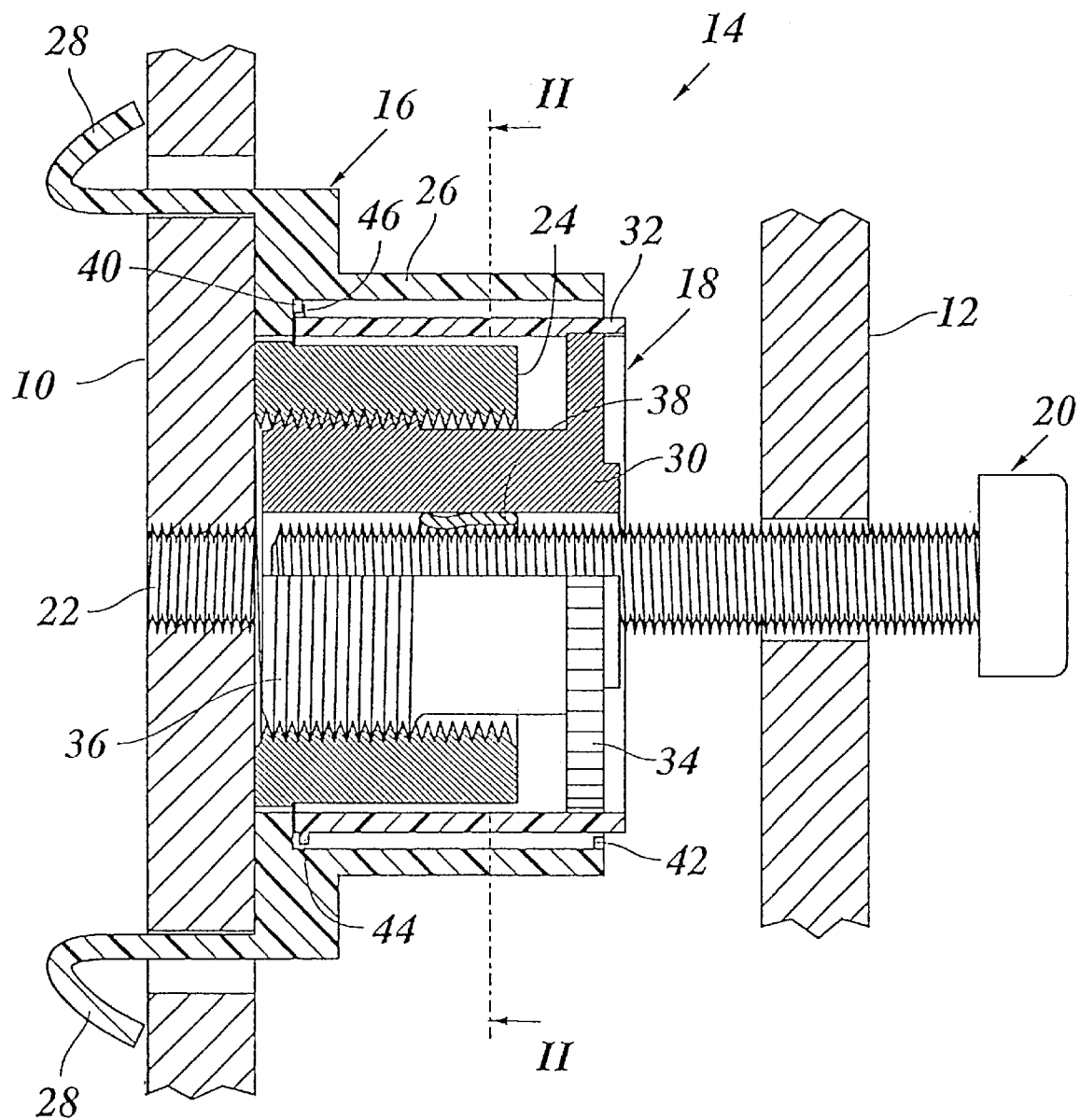
FIG. 1 shows an axial section through a connecting device and two structural components, which are to be connected.

In FIG. 1, two plate-shaped structural components 10, 12 are shown, which are to be connected to one another at a distance from one another by a connecting device 14. The connecting device 14 is formed by a base part 16, which is held at the structural component 10, a spacer 18, which is screwed into the base part 16, and a connecting screw 20, which is inserted through the structural component 12 and inserted into a central borehole of the spacer 18 and, during the establishment of the connection, is screwed into a threaded borehole 22 of the structural component 10.

The base part 16 has a metal core 24, which is supported at the structural component 10 and, at the outer periphery, has a knurled collar, onto which the plastic jacket 26 is pressed. The jacket 26 forms two claws 28, with which the base part 16 is clipped non-rotationally to the structural component 10.

The spacer 18 also has a metal core 30, which is surrounded by a plastic jacket 32. The jacket 32 is pressed onto a knurled collar 34 of the core 30 and grips into an annular space between the core 24 and the jacket 26 of the base part 16.

The cores 24, 30 of the base part and of the spacer engage one another by means of a left-handed thread 36. In the central bore hole of the spacer 18, a lock washer 38 is pressed, which brings about a non-positive connecting with the outer thread of the connecting screw 20.

When the connecting screw 20 is screwed into the threaded borehole 22 of the structural component 10, the spacer 18 is carried along in the direction of rotation, while the base part 16 is held non-rotationally by the claws 28. Therefore, because of the left-handed thread 36, the spacer 18 is screwed out of the base part 16, so that it moves axially towards the structural component 12 which, in turn, is pressed by the head of the connecting screw 20 against the spacer.

At the opposite ends of the outer jacket 26 of the base part 16, two cog-shaped stops 40, 42 are formed, which are offset by 180°, protrude towards the inside from the jacket 26 and, together with a further stop, which is formed by a rib 44 on the outer periphery of the jacket 32 of the spacer 18, limit the adjusting path of this spacer in the screwing-in as well as in the screwing-out direction. As can be seen clearly in FIGS. 2 and 3, the rib 44 has the shape of a left-handed helix which, at the free end of the jacket 32, runs almost completely around the jacket. The pitch of this helix is identical with the pitch of the left-handed thread 36. The opposite ends 46, 48 of the rib 44 are opposite to one another at a distance, which is slightly larger than the peripheral length of the stops 40 and 42.

Figure 2:
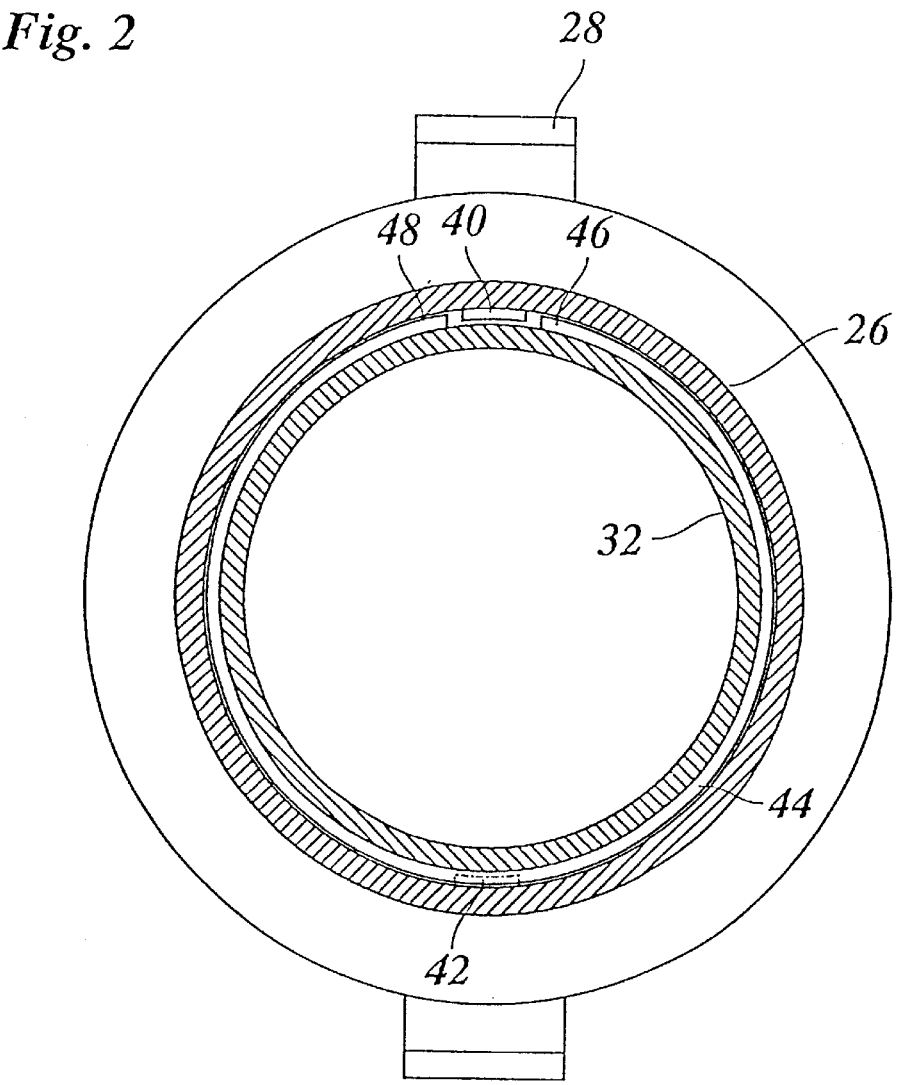
FIG. 2 shows two jackets, which belong to the connecting device, in a section in the plane II—II of FIG. 1.
Figure 3:
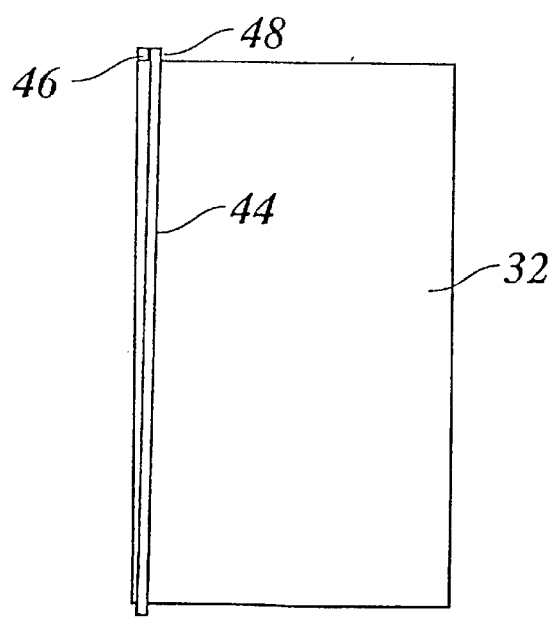
FIG. 3 shows a side view of one of the jackets.

In the state shown in FIGS. 1 and 2, the end 46 of the rib 44 lies against the stop 40 and thus prevents further rotation to the left of the spacer 18. In this way, the screwing-in motion of the spacer is limited. However, if the spacer 18 is rotated to the right with the help of the connecting screw 20, the opposite end 48 of the rib can move past the stop 40. After a full revolution, the spacer 18 emerges from the base part 16 by the length of a thread pitch of the left-handed thread 36, so that the end 46 of the rib 44 can then move past the stop 40.

Figure 4:
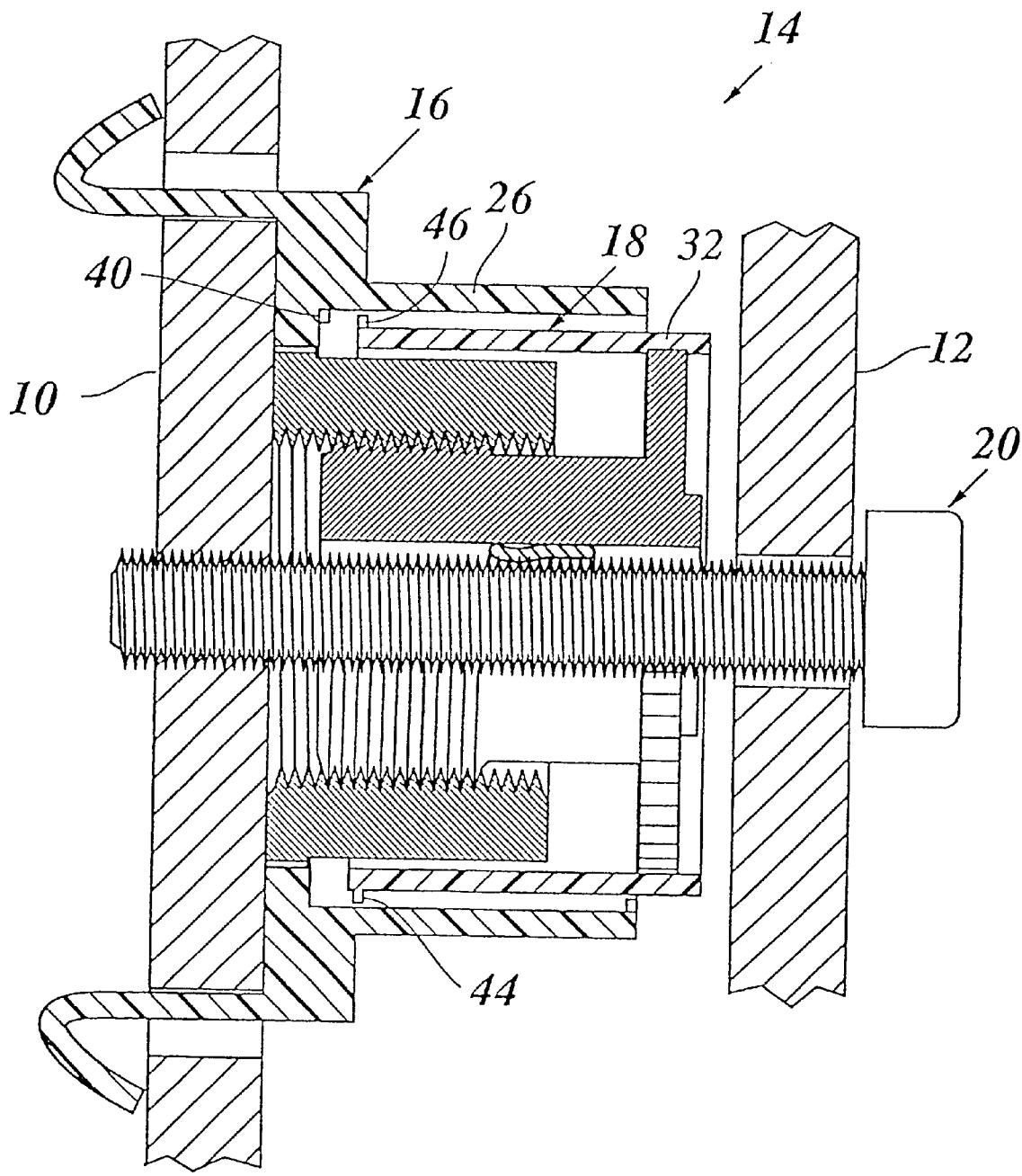
FIG. 4 shows the connecting device of FIG. 1 in the state during the establishment of the connection.

As the connecting screw 20 is screwed in further, the state, shown in FIG. 4, is then reached as an intermediate state, in which the spacer 18 has already moved some distance out of the base part 16. If the connecting screw 20 is screwed in further, the structural component 12 is clamped tightly between the head of the connecting screw and the end of the spacer 18 and, with that, a stable connection is established between the structural components 10 and 12.

Figure 5:
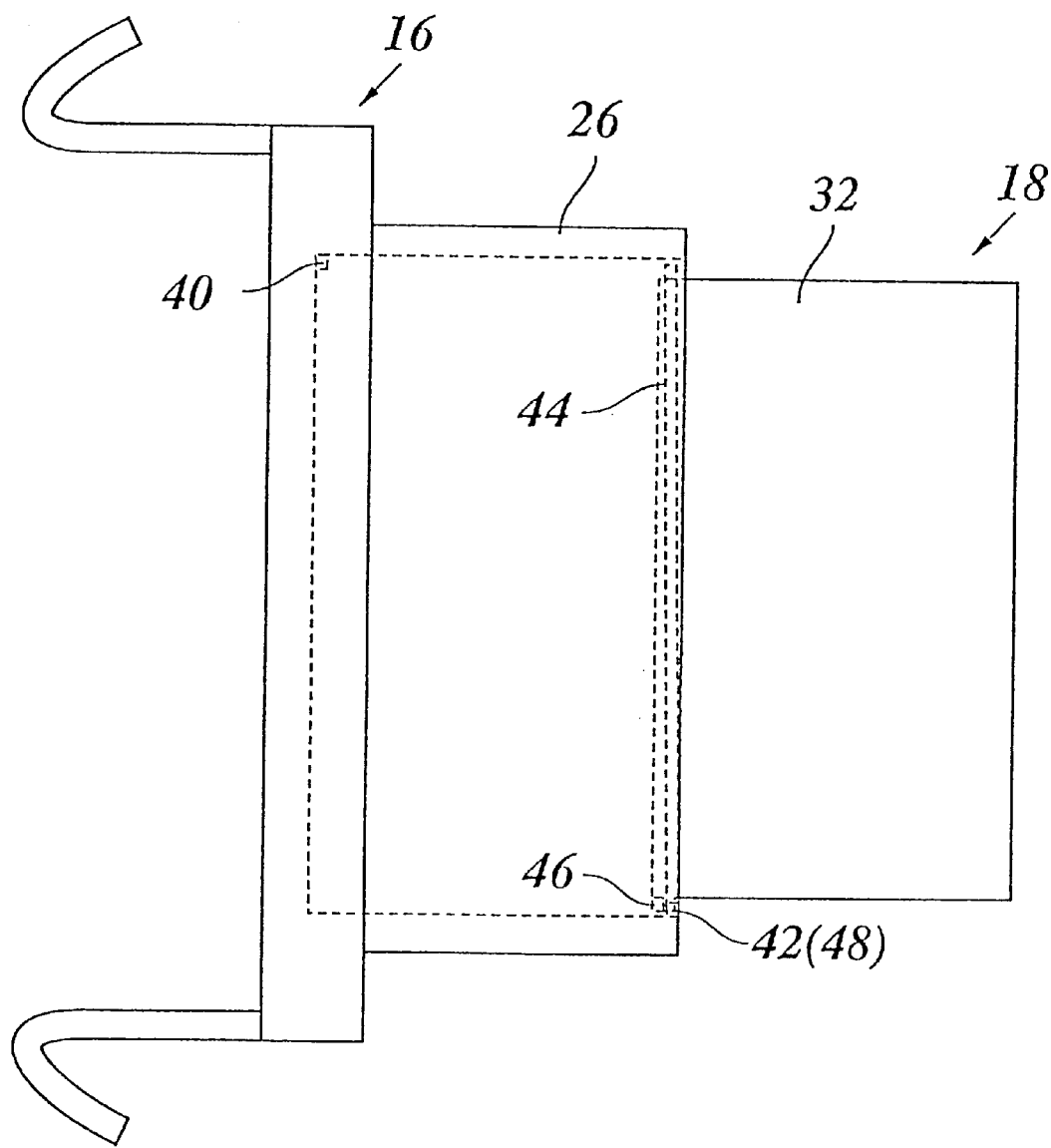
FIG. 5 shows a side view of the connecting device without the structural components, which are to be connected, in the state with the maximum axial dimension.

If the distance between the structural components were larger and the connecting screw 20 were longer, the spacer 18 could be moved out further. The screwing-out movement of the spacer is, however, limited owing to the fact that the end 48 of the rib 44 comes up against the stop 42, as shown in FIG. 5. In this way, it is prevented that the spacer 18 can be screwed out completely from the base part 16.

As can be seen in FIGS. 1 and 4, the jacket 32 of the spacer projects somewhat beyond the core 30 with its end facing the structural component 12. Therefore, when the spacer comes up against the structural component 12, there is frictional contact between the jacket 32 and the structural component 12. Since the jacket 32 consists of plastic, damage to the surface of the structural component 12 is avoided. However, if a more stable support of the spacer 18 at the structural component 12 is desired, the end of the jacket 32 can also be offset back into a flush position, so that the spacer 18 is also supported with its metal core 30 at the structural component 12.

The procedure for producing the connecting device, described above, may be as follows. The core 30 of the spacer is screwed into the core 24 of the base part 16, before these metal parts are connected with the associated plastic jackets. The screwing in therefore is not impeded by the stops 40, 42 and the rib 44. The screwing-in depth can be adjusted to a particular value by inserting a suitable gauge in the space between the collar 34 of the spacer and the front surface of the core 24 of the base part.

The jacket 32 is then pushed from the left in FIG. 1 over the core 24 of the base past and pressed onto the collar 34 of the spacer. Subsequently, the jacket 26 of the base part is pushed, once again from the left in FIG. 1, over the jacket 32. At the same time, the jacket 26 is held in an angular position, in which the stop 40 can enter the space between the ends 46, 48 of the rib 44. In this position, the jacket 26 is then pushed onto the core 24, until its front surface is a flush with the front surface of the core 24.

The end position of the spacer 18, in the screwed-in position shown in FIG. 1, can be defined precisely in this way. The adjusting path of the spacer is defined by the position of the stops 40 and 42. Since these stops are diametrically opposite to one another in the example shown, the adjusting path of the spacer corresponds to (n+½) revolutions and accordingly amounts to (n+½) times the pitch of the left-handed thread 36 (n is a whole number). This adjusting path can also be varied infinitely by changing the angular offset between the stops 40 and 42.

The end position of the spacer 18 in the screwed-in position preferably is selected so that the front surface of the spacer 18, facing the structural component 10, is recessed slightly from the front surface of the base part 16. By these means, it is prevented that the spacer 18 becomes jammed, when the base part 16 is pressed against the structural component 10.

Figure 6:
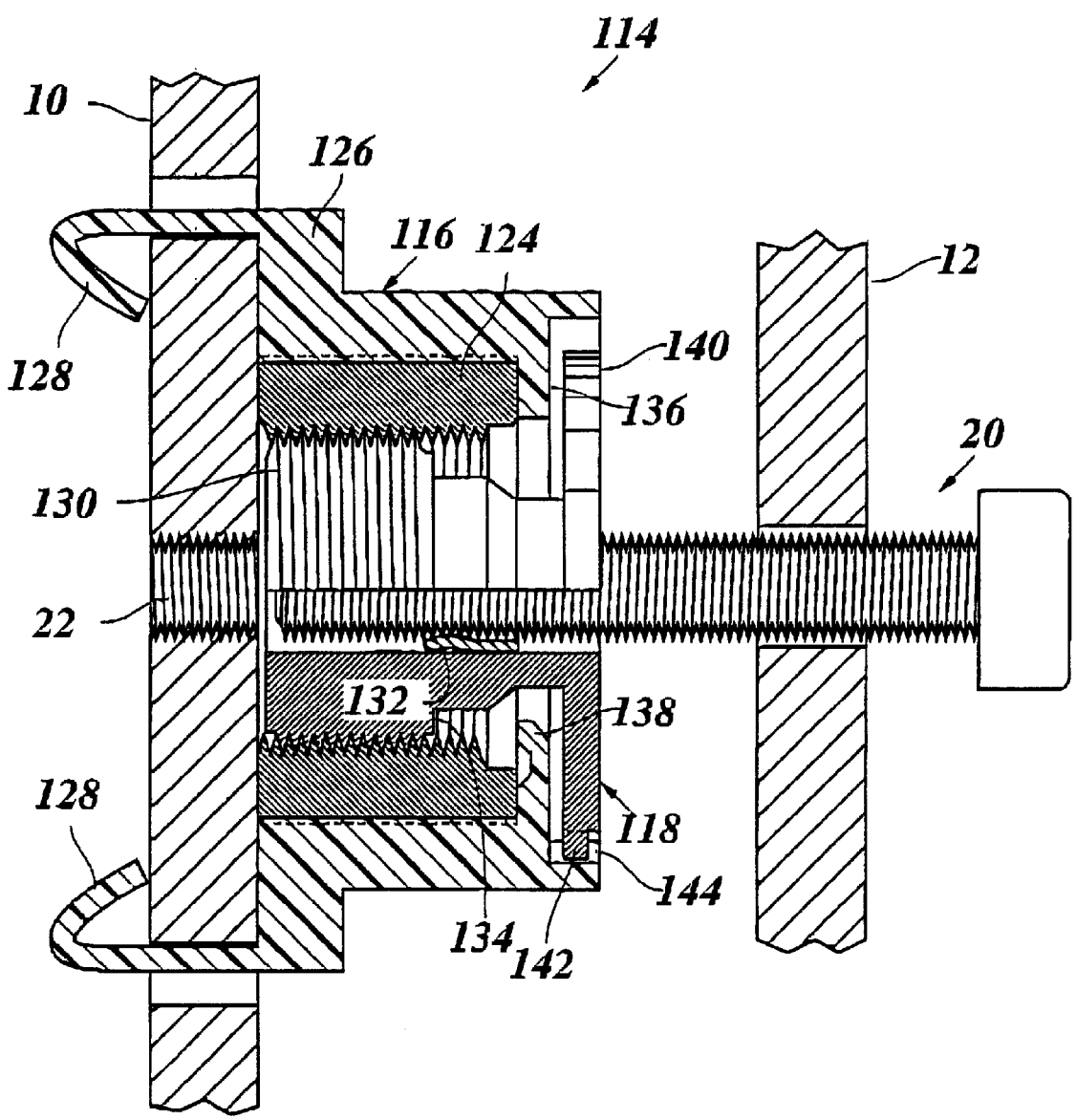
FIG. 6 shows an axial section through a connecting device of a different embodiment.

FIG. 6 shows a connecting device 114 of a different embodiment. The connecting device 114 is formed by a base part 116, which is held at the structural component 10, a spacer 118, which is screwed into the base part 116, and the connecting screw 20, which is inserted through the structural component 12 and into the central borehole of the spacer 118 and, during the establishment of the connection, is screwed into the threaded borehole 22 of the structural component 10.

The base part 116 has a threaded metal bushing 124, which is supported at the structural component 10 and, at the outer periphery, has a milled edge, onto which a plastic jacket 126 is pressed. The jacket 126 forms two claws 128, with which the base part 116 is clipped non-rotationally to the structural component 10.

The spacer 118 consists completely of metal. The threaded bushing 124 of the base part and the spacer engage one another by means of a left-handed thread 130. A lock washer 132, which establishes a non-positive connection with the external thread of the connecting screw 20, is pressed into the central borehole of the spacer 118.

When the connecting screw 20 is screwed into the threaded borehole 22 of the structural component 10, the spacer 118 is carried along in the direction of rotation, while the base part 116 is held non-rotationally by the claws 128. Therefore, because of the left-handed thread, the spacer 118 is screwed out of the base part 116, so that it moves axially onto the structural component 12 which, in turn, is pressed by the head of the connecting screw 20 against the spacer.

The left-handed thread 130 of the spacer 118 is bounded at one end, on the right hand side in FIG. 6, by a shoulder 134. At the inner peripheral edge, the jacket 126 forms a circulating collar 136, at which one end of the threaded bushing 124 is supported. An elastic latch 138 protrudes inwards at least at one place on the periphery from this collar 136. This latch 138 forms a stop, which interacts with the shoulder 134 and, in this way, limits the maximum extension path of the spacer 118.

At the end facing the structural component 12, the spacer 118 has a radially protruding flange 140, which forms a stop surface for the structural component 12, when the structural components 10 and 12 are clamped together by the connecting screw 20. In the state shown in FIG. 6, in which the spacer 118 still is retracted completely in the base part 116, the outer surface of the flange 140 concludes flush with the front surface of the jacket 126. A projection 142, starting out radially from the edge of the flange 140, lies at an inwardly protruding stop 144 of the base part 116. The stop 144 thus prevents the spacer 118 being rotated to the left in the screwing-in direction of the connecting screw 20. Accordingly, the spacer 118 cannot be shifted beyond the position, shown in FIG. 6, in the direction of the structural component 10. However, when the connecting screw 20 is screwed to the right into the threaded bushing 124, the spacer 118 can rotate along to the right, since then the projection 142 is freed from the stop 144. After a complete revolution of the spacer 118, the projection 142 has already emerged to such an extent from the base part 116, that it can move outside of the base part past the stop 144.

In the case of the example shown, it is thus ensured that the spacer 118 cannot be screwed out of the base part 116 in the one or the other direction.

However, for assembling the connecting device, the spacer 118 can be screwed from the right side in FIG. 6 into the threaded bushing 124 of the base part. In so doing, the elastic latch 138 initially is bent towards the inside, so that it gives way to the spacer 118. As the spacer is screwed in further, the latch 138 then slides along the outer threads of the spacer and finally slides over the shoulder 134, so that it can spring back once again into its original position, in which it acts as a stop for the shoulder 134.

Figure 7:
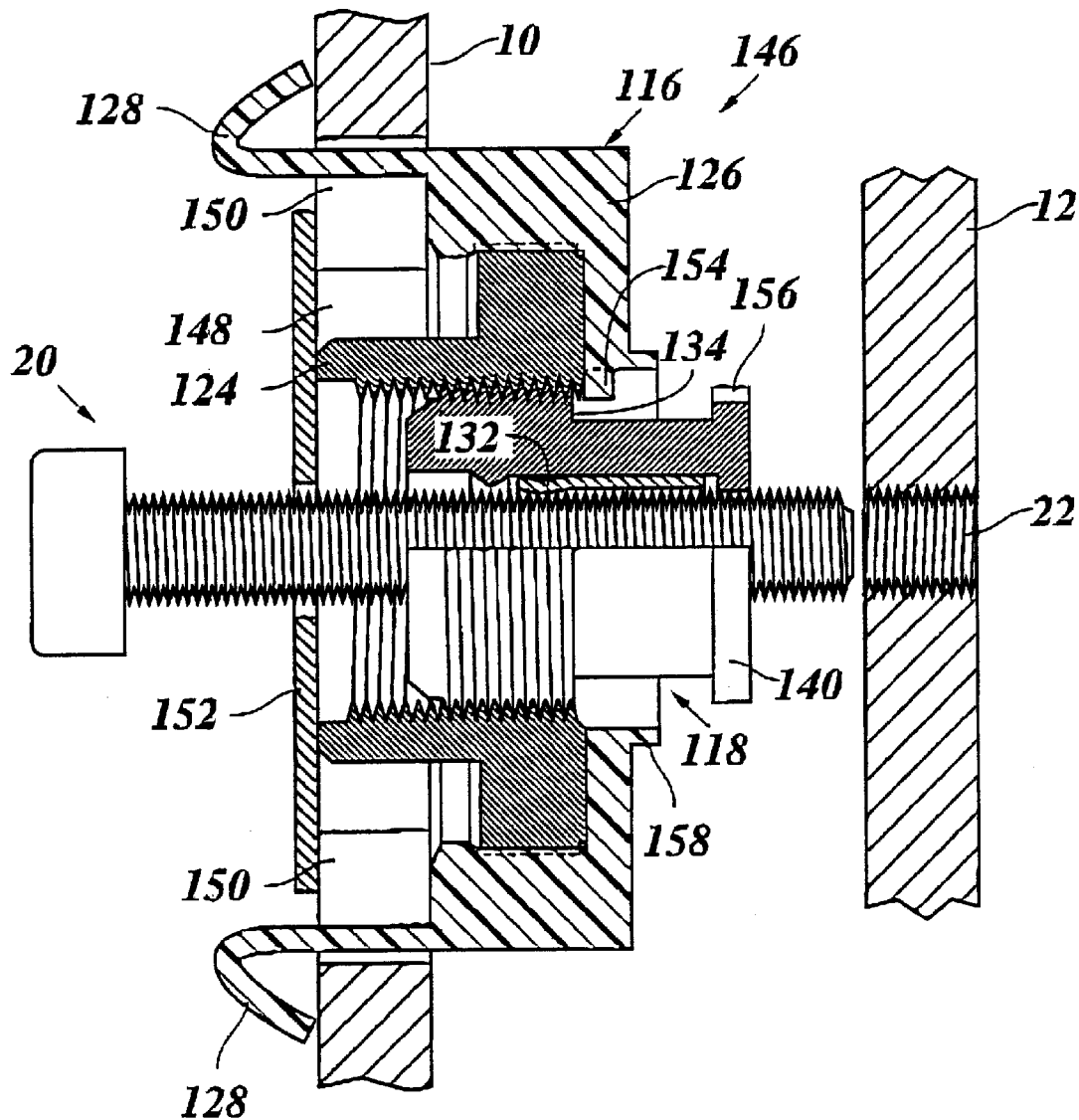
FIG. 7 shows a connecting device of a further embodiment and FIG. 8 shows a part of the connecting device of FIG. 7 in a front view.
Figure 8:
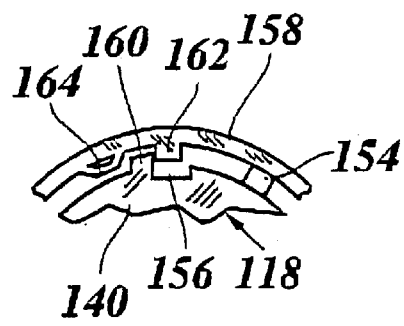

FIGS. 7 and 8 show a further example of a connecting device 146, for which the connecting screw 20 is screwed in from the opposite end. In this case, the structural component 10 has a keyhole-shaped opening 148 with two diametrically opposed protuberances 150 for accommodating the claws 128. The circular inner part of the opening 148 is covered by a disc 152, at which the head of the connecting screw 20 and the threaded bushing 124 of the base part 116 are supported.

The threaded bushing 124 and the spacer 118 in this case have a right-handed thread, so that the spacer 118 moves to the right in FIG. 7 in the direction of the structural component 12, when the connecting screw 20 is turned to the right.

FIG. 7 shows the spacer 118 already in the extended state, in which the shoulder 134 has already almost reached the stop position. In this case however, the stop at the jacket 126 is formed by a rigid projection 154 and not by a spring-mounted latch. The flange 140, which is formed at the spacer 118 and in this case has a smaller diameter, has a recess 156, through which the projection 154 can pass axially, at one place of its periphery.

During the assembly of the connecting device 146, initially the threaded bushing 124 and the spacer are screwed together, before the threaded bushing 124 is pressed into the jacket 126. The spacer 118 can therefore be screwed from the right in FIG. 7 into the threaded bushing 124, until it has reached approximately the screwed-in position shown in FIG. 7. Subsequently, the spacer 118 and in the threaded bushing 114 are inserted jointly from the left side in FIG. 7 into the jacket 126. In so doing, the spacer 118 is held at an angular position, in which the projection 154 can pass through the recess 156. In the end phase of the insertion movement, the threaded bushing 124 is then pressed with its milled outer circumferential edge into the jacket 126.

Finally, the spacer 118 is screwed deeper into the threaded bushing 124, until its opposite end faces are flush with the corresponding surfaces of the base part 116 and the jacket 126, respectively.

In the state, in which the connecting device has the smallest possible axial dimension, the base part 116 is then clipped to the structural component 10 and the connecting screw 20 is inserted and screwed in, so that the spacer 118 can then be extended once again.

FIG. 8 shows a part of the front surface of the flange 140, as well as a part of the collar 158, which is formed at the jacket 126 and surrounds this flange 140. In this state shown in FIG. 8, the recess 156, which is formed at the edge of the flange 140, is twisted with respect to the projection 154 of the base part. At the left flank of the recess 156 in the view of FIG. 8, a projection 160 is formed, which protrudes radially towards the outside from the edge of the flange 140. A stop 162, which protrudes towards the inside, and a bridge-like stop spring 164 are integrally molded to the inner peripheral surface of the collar 158. As long as the flange 140 lies axially outside of the base part, as shown in FIG. 7, the spacer 118 can be turned to the right and, with that, screwed deeper into the base part 116. During the last revolution, immediately before the minimum axial dimension is attained, the flange 140 enters the collar 158. The projection 160 initially, overcoming a certain resistance, slides over the lock spring 164 and then comes into contact with the stop 162. The further screwing-in movement of the spacer 118 is limited in this manner. The spacer is held by the stop spring 164 in the position attained with the minimum axial dimension and prevented from shifting because of vibrations. However, the force of the stop spring 164 is dimensioned, so that it can be overcome by the frictional resistance between the connecting screw 20 and the spacer, when the connecting screw 20 is being screwed in. During the screwing-in movement, the spacer 118 rotates to the left in the view of FIG. 8, so that the projection 160 distances itself from the stop 162.

What is claimed is:

1. A device for connecting two structural components, comprising:
    a base part disposed at one structural component,
    a spacer having a core which is in threaded engagement with the base part and has a front surface for supporting the spacer at the other structural component, and
    a connecting screw inserted frictionally engaged through the spacer,
    wherein the spacer has a jacket which is firmly seated at a periphery of the core, overlaps and surrounds a portion of the base part and surrounds the core so as to be one of:
       flush with respect to a front surface of the core of the spacer, and
       slightly protrudes with respect to said front surface of the core of the spacer.

2. The device of claim 1, wherein:
    stops are disposed on said jacket and on the base part and limit an unscrewing motion of the base part and of the spacer.

3. The device of claim 2, wherein the jacket and the base part have a further pair of stops, which limit screwing-in movement of the base part and the spacer.

4. The device of claim 3, wherein the stops are disposed so that they move past one another during rotation of the spacer within an adjusting range and, only when an end position in a direction of rotation of the spacer is reached, are moved into a contacting position.

5. The device of claim 4, wherein one of the stops is formed by a helical rib having a pitch which is identical with a pitch of a thread between the base part and the spacer and opposite ends of which are at such a distance from one another in a circumferential direction, that they can accommodate a stop between themselves.

6. The device of claim 5, wherein the rib is constructed on the jacket.

7. The device of claim 1, wherein the jacket is held by one of:

a press fit, and a catch on the core of the spacer.

8. The device of claim 1, wherein the base part has a core lying within the jacket of the spacer and a jacket of the base part, which surrounds the jacket of the spacer.

9. The device of claim 8, wherein:

stops are disposed on said jacket of the spacer and on the inner periphery of the jacket of the base part and limit an unscrewing motion of the base part and of the spacer.

10. The device of claim 1, wherein the jacket is made of a plastic material.

11. A device for connecting two structural components, comprising:

a base part disposed at one structural component, a spacer in threaded engagement with the base part and having a front surface for supporting the spacer at the other structural component, and a connecting screw inserted frictionally engaged through the spacer, wherein the spacer is surrounded by a jacket of a softer material which, at least in a state in which the spacer and the base part together have a smallest axial dimension, is one of:

flush with a front surface of the spacer, and protrudes with respect to said front surface of the spacer, and wherein the base part includes a harder core and said jacket is seated firmly on the harder core.

12. The device of claim 11, wherein movement of the spacer relative to the base part in one direction is limited by a shoulder, which is formed at the end of a threaded section of the spacer and comes up against a stop of the base part, which stop becomes effective only after the spacer and the base part are assembled.

13. The device of claim 12, wherein the stop is formed by a spring element, which yields when the spacer is being screwed in and then moves behind the shoulder, forming a lock.

14. The device of claim 13, wherein the base part has a threaded bushing of metal, which is surrounded by the jacket of the base part, and wherein the spring-mounted latch is formed on the jacket of the base part.

15. The device of claim 12, wherein the base part has a threaded bushing of metal, which is held by a press fit in the jacket of the base part, and wherein the stop is constructed rigidly on the jacket of the base part.

16. The device of claim 15, wherein the flange, at an outer peripheral edge, has a recess, which is complementary to the stop of the base part, which acts together with the shoulder.

17. The device of claim 12, wherein the spacer has a radially protruding flange at an end thereof facing the shoulder and wherein a projection, starting out from the flange, together with a stop formed on the base part, limits rotational movement of the spacer in an end position relative to the base part.

* * * * *